United States Patent Office 2,885,433
Patented May 5, 1959

2,885,433
O-CARBAMYL-D-SERINE

Guy Hagemann, Vincennes, Lucien Penasse and Jean Teillon, Paris, France, assignors to Les Laboratoires Francais de Chimiotherapie, Paris, France, a corporation of France No Drawing. Application August 16, 1955
Serial No. 528,832

Claims priority, application France August 19, 1954

1 Claim. (Cl. 260—482)

The present invention relates to a new serine compound and more particularly to the new O-carbamyl-D-serine, and to a process of making same.

It is one object of the present invention to provide a new and valuable serine compound, namely the O-carbamyl-D-serine.

Another object of the present invention is to provide a process of preparing such new and valuable O-carbamyl-D-serine.

A further object of the present invention consists in providing a new fermentation process of preparing said O-carbamyl-D-serine by cultivating Streptomyces polychromogenus and the like microorganisms.

Still another object of the present invention is to provide preparations containing such O-carbamyl-D-serine in an amount sufficient to be useful as therapeutic agent in veterinary medicine.

Other objects of the present invention and advantageous features thereof will become apparent as the description proceeds.

In principle, the present invention consists in providing the new O-carbamyl-D-serine of the following formula

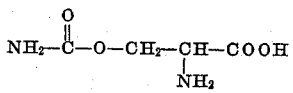

Said O-carbamyl-D-serine has proved to be therapeutically effective in animal and humans and seems to have a favorable effect on the defense mechanism of the organism against infections.

The new O-carbamyl-D-serine forms colorless needles. Its melting point, on slow heating, is 226–234° C. (with decomposition); its instantaneous melting point is 238° C. (with foaming); its rotatory power $[\alpha]_D^{20} = -19.6°$ (concentration: 2% in N hydrochloric acid solution) or $[\alpha]_D = +2°$ (concentration: 1% in water). Its ultraviolet absorption above 200 mµ is negligible.

O-carbamyl-D-serine is very soluble in dilute hydrochloric acid and in warm water; it is soluble in water of 20° C. in an amount of 2%; it is very slightly soluble in methanol and ethanol, and is insoluble in most of the other solvents.

The new compound, on testing by paper chromatography, yields a spot which can be developed by means of ninhydrin in the following solvents:

| | Rf |
|---|---|
| (1) Phenol adjusted by means of borate buffer to a pH of 9.3 | 0.41 |
| (2) Phenol adjusted by means of borate buffer to a pH of 11.2 | 0.27 |
| (3) Mixture of 80 parts of pyridine, 40 parts of isoamyl alcohol, and 70 parts of water | 0.33 |
| (4) Mixture of 75 parts of butanol, 15 parts of formic acid, and 10 parts of water | 0.08 |

After chromatographic treatment in the one or the other of said solvents, a number of color reactions specific to the presence of certain chemical groups have been carried out with the following results:

| | |
|---|---|
| Ninhydrin | Violet coloration |
| Copper complex according to Wieland | Positive reaction |
| Barrenschen-Weltman reagent | Positive reaction |
| Sakaguchi reagent | Negative reaction |
| Pauly reagent | Negative reaction |
| Benzidine reagent | Negative reaction |

Determination of amino nitrogen by means of nitrous acid according to the method of Van Slyke yields the following results:

| | Percent |
|---|---|
| After a reaction time of 10 minutes | 9.6 |
| After a reaction time of 60 minutes | 18.0 |

Hydrolysis by means of hydrochloric acid in a sealed tube at 100° C. yields a hydrolysate which produces only a single spot when subjected to paper chromatography by means of the above mentioned solvents. Said spot indicates the presence of serine.

Said hydrolysate, when rendered alkaline by the addition of sodium carbonate and subjected to steam distillation, splits off ammonia in an amount corresponding to 50% of the total nitrogen present in said compound.

Formol titration, carried out with 30 mg. of the compound by means of a pH measuring device, indicates that its molecular weight is 144 (theoretical molecular weight for carbamyl serine: 148).

O-carbamyl-D-serine yields a copper complex compound. On heating 100 mg. of O-carbamyl-D-serine and 200 mg. of freshly precipitated copper carbonate on the water bath, said complex compound is immediately formed whereby the solution attains an intense blue color. The reaction mixture is filtered and the filtrate is cooled. Thereby, small blue crystals precipitate. Said crystals, after filtration and drying, decompose at 257° C.

O-carbamyl-D-serine yields, on reaction with 2,4-dinitro fluoro benzene, by mono-substitution, a dinitro phenyl derivative in the form of needles which melt at 166° C. On analysis of said compound it was found that it corresponds to the general formula $C_{10}H_{10}O_8N_4$ as expected. Hydrolysis of said derivative with hydrochloric acid produces a compound which, on paper chromatography, has been found to be identical with the synthetically produced 2,4-dinitro phenyl serine while the dinitro phenyl derivative used as starting material is different therefrom. This test shows that the α-amino group of the new compound is free and that the substituent is attached to the hydroxyl group. A hydrolysate of the dinitro phenyl derivative as obtained on subjecting the alkaline solution to steam distillation, shows, by titration, that one equivalent of volatile base is split off for 310 parts of the dinitro phenyl derivative. This indicates that the carbamyl substituent had not been eliminated during formation of the dinitro phenyl derivative.

In aqueous solution, the dinitro phenyl derivative is distinctly acid which indicates that the carboxyl group in said compound is free. Titration of said acidity by means of a pH measuring device indicates a molecular weight of 310 (theoretical molecular weight of the dinitro phenyl derivative: 314).

Oxidation of serine by means of periodic acid sets free one molecule of ammonia according to the following equation

However, when subjecting the new compound to such a periodic acid oxidation, no ammonia is formed. On the other hand, after preliminary hydrolysis and steam distillation of the volatile basic compounds formed, oxidation with periodic acid yields 50% of the nitrogen initially present in said new compound, in the form of ammonia. Since the dinitro phenyl derivative described hereinbefore is formed by substitution of the nitrogen atom, the carbamyl substituent, which prevents periodic acid oxidation, can only be attached to the hydroxyl group of serine.

When subjecting the new compound to hydrolysis by means of sulfuric acid and determining the carbon dioxide evolved thereby, it was found that 0.97 mol of carbon dioxide are split off per mol of the new compound. In contrast hereto, DL-serine, when hydrolyzed with sulfuric acid under like conditions, does not split off carbon dioxide.

All these results, supported by the analytical data obtained by combustion analysis, indicate that the new carbamyl serine compound is an O-substituted serine derivative. Said substituent is readily hydrolyzable, has a molecular weight of about 40, contains one nitrogen atom, yields, on hydrolysis, one mol of carbon dioxide, and does not produce hydrolytic cleavage products which can be detected by paper chromatography.

The only group which corresponds to the different characteristic properties mentioned above is the carbamyl group. Its presence is, furthermore, confirmed by the positive reaction according to Barrenschen-Weltman.

To determine its optical configuration, the new compound is subjected to hydrolysis by means of hydrochloric acid. The rotatory power of the product obtained on such hydrolysis was found to be $[\alpha]_D^{20} = -13°$ (concentration: 1% in N-hydrochloric acid). Purification of said product of hydrolysis showed that it is identical in all respects with a sample of D-serine prepared by resolving DL-serine which also has a rotatory power $[\alpha]_D^{20} = -13°$ as stated in the literature for D-serine.

According to the present invention O-carbamyl-D-serine is prepared by microbiological synthesis by cultivating under artificial conditions on a suitable nutrient medium a microorganism of the order Actinomycetales and the family Streptomycetacae. Said microorganism shall be designated hereinafter and in the claims attached hereto as "Streptomyces chromogenus." After fermentation is completed, the insoluble parts of the culture, such as the mycelium, are separated and removed by filtration or centrifuging.

O-carbamyl-D-serine is extracted from the resulting clear filtrate which may previously be concentrated, by absorption to a sulfonic ion exchange agent in its acid form. Such ion exchange agents are known to the trade, for instance, as "Amberlite IR–120," "Permutit Q," or "Dowex 50." For this purpose, the filtrate is passed through a tube filled with said ion exchange agent. The column is then washed with water. The adsorbed O-carbamyl-D-serine is eluted from the washed column by means of an aqueous solution of a weak volatile base, such as ammonia, pyridine, triethyl amine, and others. The eluate is concentrated by evaporation. On cooling, O-carbamyl-D-serine precipitates and is purified by recrystallization. Cultivation of said microorganism may be effected either in surface cultures on a suitable nutrient medium or in submerged cultures under sterile conditions whereby the culture is agitated and sterile air is blown into and through the culture. The procedure followed and the apparatus employed are the same as conventionally used in the manufacture of antibiotics. The cultivating conditions, such as temperature and duration, and the composition of the nutrient medium can vary within wide limits without departing from the scope of the present invention. The principal characteristic features of this invention are the selection of a specific microorganism and the extraction of O-carbamyl-D-serine from the fermentation broth by means of a sulfonic ion exchange resin in acid form from which the new compound can be eluted by means of a weak volatile base.

"Streptomyces polychromogenus" has not been described heretofore. It has been isolated from a sample of Venezuelan soil. Its cultures obtained by selective cultivation on an agar nutrient medium exhibit the following characteristic properties:

The growth of a pure culture at a temperature of 28° C. on a culture medium containing 1.0% of anhydrous glucose,
0.05% of di-potassium phosphate,
0.05% of asparagine, and
2.0% of agar is quite abundant. The vegetative mycelium has a light brown to pale yellow color. The aerial mycelium is first white and then changes its colors to a bright greenish blue which, on aging, becomes pale green. The edge of the colony is of arborized (dentritic) contour. The soluble, discrete pigment is of very pale yellowish-brown color. The aerial hyphae are more or less branched and are divided into fragments of chains of ovoid spores. Their terminal or apical parts do not form spirals.

Streptomyces polychromogenus does not reduce nitrates. It coagulates and peptonizes milk. On a potato starch nutrient medium, it secretes amylases. On a medium which consists of 0.25% of ammonium sulfate,
0.25% of monopotassium phosphate,
0.5% dipotassium phosphate,
0.1% of magnesium sulfate heptahydrate,
0.0006% of copper sulfate pentahydrate,
0.0001% of ferrous sulfate heptahydrate,
0.0008% of manganous chloride tetrahydrate,
0.00015% of zinc sulfate heptahydrate, and
2.0% of agar, Streptomyces polychromogenus grows readily in the presence of sucrose, glucose, fructose, and d-xylose, but less readily in the presence of d-galactose and rhammose. Lactose, on the other hand, is not assimilated.

Streptomcyes polychromogenus is sensitive to exposure to elevated temperature. Optimum growth is achieved at a temperature of 28° C. A temperature of 37° C. impairs its multiplying power. Such a temperature prevents production of an aerial mycelium.

Said microorganism is also sensitive to acid pH-values. Acid culture media inhibit and retard its growth. For instance, it is possible to cultivate cultures of said microorganism on potatoes only if the potatoes are impregnated with a buffer solution of a pH 7.0.

In a culture medium which consists of

1% of pure glucose,
0.5% of soybean peptone,
0.5% of an aqueous heart extract,
0.5% of sodium chloride,
0.1% of calcium carbonate, and
2.0% of agar, said Streptomyces organism is fully resistant to the presence of one µg./cc. of the hydrochloride of chlorotetracycline, penicillin G, and chloramphenicol, it is partly resistant to the presence of 1 µg./cc. of streptomycin sulfate and framycetine sulfate, and it is readily affected by 1 µg./cc. of erythromycin.

Streptomyces polychromogenus is characterized by variations in its endocellular as well as exocellular pigmentation. Thus, for instance, the aerial mycelium can be of bright pink to pale pink color without any change in the other morphological and physiological characteristic properties, in particular, without any impairment of its ability to synthesize O-carbamyl-D-serine. In submersed cultures said microorganism can secrete a pigment which, usually, is of brown color but may also be of olive-green or dark violet color.

The species Streptomyces polychromogenus is kept in the collection of species of microorganisms of the Société Francaise de la Penicilline of Romainville, Seine, France, under the reference No. "T-4473." A culture of said species *Streptomyces polychromogenus* has been deposited with the American Type Culture Collection at Washington, D.C., under the No. ATCC 12,595.

The nutritive requirements of *Streptomyces polychromogenus* are not yet known exactly. However, numerous tests carried out with different sources of carbon and nitrogen have shown that it is possible to use, in a nutrient medium suitable for submerged cultivation, the following nutrients:

Soybean meal,
Distiller's solubles,
Baker's yeast,
Enzymatic caseine hydrolysates,
Crude glucose,
Dextrin.

The following examples serve to illustrate the present invention without, however, limiting the same thereto.

EXAMPLE 1

The inoculum required for cultivation under suitable conditions of sterility and while aerating at a temperature at or near 28–30° C. is either directly composed of a suspension of spores of *Streptomyces polychromogenus* or is cultivated on submerged cultures of said Streptomyces species by incubation at 28° C. for 48 hours, while agitated on a shaking device, in a nutrient medium consisting of 1% of glucose,
0.5% of dry malt extract,
0.5% of soybean meal,
0.5% of sodium chloride,
0.5% of dry corn steep liquor, and
0.1% of calcium carbonate.

The last mentioned inoculum is especially suitable for inoculating large scale fermentation tanks.

In a 500 l. fermentation tank, there are introduced 300 l. of a nutrient medium consisting of 2.6% of de-oiled soybean meal,
1.0% of dextrin,
1.0% of crude glucose,
0.3% of magnesium sulfate heptahydrate, and
0.2% of calcium carbonate.

After sterilization of said nutrient medium by heating to 120° C. for 40 minutes, the medium is inoculated with a culture of *Streptomyces polychromogenus* prepared as indicated hereinabove. The inoculated medium is then kept at a temperature of 28° C. for 50 hours whereby it is agitated and aerated under the conditions oridinarily used in the manufacture of antibiotics. The resulting culture is then centrifuged and the clear filtrate is worked up for the recovery and isolation of O-carbamyl-D-serine as described hereinafter in Example 3.

EXAMPLE 2

A nutrient medium which is indentical with that described in Example 1 and used in fermentation tanks is filled into Erlenmeyer flasks and is inoculated with spores of *Streptomyces chromogenus*. The flasks are then shaken on a shaking device in a chamber at 28° C. Fermentation is interrupted after 5 days. The culture is centrifuged as described in Example 1.

EXAMPLE 3

One liter of the clear centrifuged solution obtained on fermentation under the conditions described in Example 1 or 2 is passed drop by drop through a column of 300 g. of "Amberlite IR-120" in acid form (moist weight). The diameter of said column is about 25 mm. The column is then washed with 500 cc. of water and, thereafter, is eluted with 100 cc. of aqueous solution containing 12% of pyridine.

The resulting eluate is concentrated by evaporation in a vacuum at 40° C. to a volume of about 30 cc. During the last stages of said concentration the product is deposited in an amorphous and faintly colored form on the walls of the flask. At said moment, there are added, while stirring vigorously, 15 cc. of methanol. Precipitation is completed by keeping the mixture at 0° C. for 24 hours. The precipitate is filtered over a fritted glass filter and is washed with 25 cc. of cold 50% methanol.

The precipitate is again dissolved in 20 cc. of warm water and treated with 0.5 g. of vegetable charcoal at 70° C. for 15 minutes. After centrifuging and decanting, an equal volume of methanol is added and the mixture is allowed to crystallize at 0° C. for 24 hours. The resulting crystals are again recrystallized in the same manner and are obtained thereby in small colorless needles which are filtered off, washed with methanol, and dried in a vacuum. 1 g. of O-carbamyl-D-serine are obtained. Its melting point (on the Maquenne block) is 238° C. (with foaming).

*Analysis.*—$C_4O_4N_2H_8$=molecular weight: 148. Calculated: 32.43% C; 5.44% H; 18.92% N. Found: 32.4% C; 5.5% H; 18.8% N.

EXAMPLE 4

*Formation of the mono-dinitro phenyl derivative of O-carbamyl-D-serine*

100 mg. of O-carbamyl-D-serine and 200 mg. of sodium carbonate are dissolved in 10 cc. of water. A solution of 150 mg. of 2,4-dinitrofluoro benzene in 50 cc. of ethanol is added thereto. The mixture is allowed to react at room temperature for 2 hours while agitating from time to time. The alcohol is evaporated in a vacuum. The remaining aqueous solution is washed with ether and is then acidified by the addition of a few drops of concentrated hydrochloric acid. N-2,4-dinitro phenyl-O-carbamyl-D-serine is precipitated. On recrystallization of said compound in aqueous ethanol, needles are obtained which melt (on the Maquenne block) at 166° C.

*Analysis.*—$C_{10}H_{10}O_8N_4$=molecular weight: 314. Calculated: 38.2% C; 3.2% H; 17.8% N. Found: 38.0% C; 3.4% H; 17.6% N.

20 mg. of said compound are hydrolyzed by means of 3 cc. of 6 N hydrochloric acid in a sealed tube at 100° C. for 4 hours. The resulting hydrolysate is extracted three times with ether. The yellow ethereal extract is evaporated to dryness. The resulting residue is subjected to chromatography and is found to be identical with synthetically produced dinitro phenyl serine.

It is, of course, understood that in place of *Streptomyces polychromogenus* used in the preceding examples, there may be employed other microorganisms of the Streptomyces genus and especially mutants obtained from *Streptomyces polychromogenus* and the like organisms by the action of mutating agents, such as X-ray radiation, ultraviolet radiation, treatment with nitrogen mustard gas and others.

The nutrient medium may contain other sources of carbon than those mentioned hereinbefore, such as saccharose, glycerine, levulose, maltose. Said nutrients can be added in pure form or in the form of suitable concentrates. The amounts to be added may vary considerably. Amounts between about 0.5% and about 5% of the nutrient medium have proved satisfactory.

Other proteins or other nitrogen containing substances than those mentioned in the preceding examples may also be used as sources of nitrogen. Such substances are, for instance, Fish meal,
Wheat-steeping liquor,
Whey,
Hydrolyzed gluten,
Linseed meal,
Peanut meal, Cottonseed meal,
Lactalbumin,
Autolyzed yeast,
Hydrolyzed caseine,
Meat peptones.

These proteins can also be added in pure form or, preferably, in their crude non-purified form as they are obtained as by-product of various industrial processes. The amounts to be added may also vary considerably and may be between about 1% and about 4% of the nutrient medium.

Other buffer substances than those mentioned in the preceding examples may be added to the nutrient medium in order to maintain the pH-value of the nutrient medium between about 6.0 and about 8.5, such as potassium mono H orthophosphate, sodium citrate, sodium acetate.

The temperature at which the cultures are incubated is between about 20° C. and about 32° C. Optimum results are obtained at about 28° C. The most favorable temperature is, of course, dependent upon the composition of the nutrient medium and the specific strain of microorganism used.

Elution of the adsorbed O-carbamyl-D-serine from the sulfonic ion exchange resin in acid form can be effected by other eluting agents than those mentioned in the preceding examples, such as, for instance, 5% ammonia solution, 3% aqueous triethylamine solution, 3% aqueous tributylamine solution.

Precipitation of the O-carbamyl-D-serine dissolved in water can be effected not only by methanol as disclosed in the preceding examples but also by other organic solvents which are miscible with water, such as ethanol, isopropanol, acetone.

As stated hereinbefore, O-carbamyl-D-serine has proved to be therapeutically effective.

O-carbamyl-D-serine's synergistic effect with antibiotics is especially interesting. For example, the combination of O-carbamyl-D-serine and chloramphenicol leads to very interesting results in the treatment of diseases caused by *Staphylococcus aureus*, *Eberthella typhi* and *Escherichia coli*.

We claim:
O-carbamyl-D-serine.

References Cited in the file of this patent

UNITED STATES PATENTS

| | | |
|---|---|---|
| 2,421,611 | Gray | June 3, 1947 |
| 2,432,049 | Swan | Dec. 2, 1947 |
| 2,462,981 | Lockwood et al. | Mar. 1, 1949 |
| 2,483,141 | Mahoney | Sept. 27, 1949 |
| 2,483,892 | Ehrlich et al. | Oct. 4, 1949 |

FOREIGN PATENTS

| | | |
|---|---|---|
| 715,362 | Great Britain | Sept. 15, 1954 |